United States Patent
Zhang et al.

(10) Patent No.: US 12,034,485 B1
(45) Date of Patent: Jul. 9, 2024

(54) COHERENT OPTICAL BREAKOUT

(71) Applicant: Cisco Technology, Inc., San Jose, CA (US)

(72) Inventors: Hongbin Zhang, Holmdel, NJ (US); Christian Rasmussen, Kongens Lyngby (DK)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 17/863,968

(22) Filed: Jul. 13, 2022

Related U.S. Application Data

(60) Provisional application No. 63/221,441, filed on Jul. 13, 2021.

(51) Int. Cl.
*H04B 10/548* (2013.01)
*H04B 10/61* (2013.01)
*H04B 10/80* (2013.01)

(52) U.S. Cl.
CPC ......... *H04B 10/548* (2013.01); *H04B 10/613* (2013.01); *H04B 10/807* (2013.01)

(58) Field of Classification Search
CPC .............................................. H04B 10/50–506
See application file for complete search history.

(56) References Cited

U.S. PATENT DOCUMENTS

| | | | | |
|---|---|---|---|---|
| 2002/0103261 | A1* | 8/2002 | Ninkov | A61K 47/44 514/731 |
| 2005/0002671 | A1* | 1/2005 | Smith | H04L 27/2096 398/83 |
| 2012/0251120 | A1* | 10/2012 | McNicol | H04B 10/506 398/43 |
| 2015/0078739 | A1* | 3/2015 | Handelman | H04B 10/032 398/2 |
| 2019/0215091 | A1* | 7/2019 | Johansson | H04B 10/07955 |

* cited by examiner

Primary Examiner — Nathan M Cors
(74) Attorney, Agent, or Firm — K&L Gates LLP

(57) ABSTRACT

A method, system, and apparatus for a coherent optical breakout; wherein the optical breakout has a laser; wherein the coherent optical breakout has a set of optical connections; wherein the set has at least two optical connections; wherein the coherent optical breakout enables coherent optical communication of X Gbs across each of the set of optical connections.

17 Claims, 11 Drawing Sheets

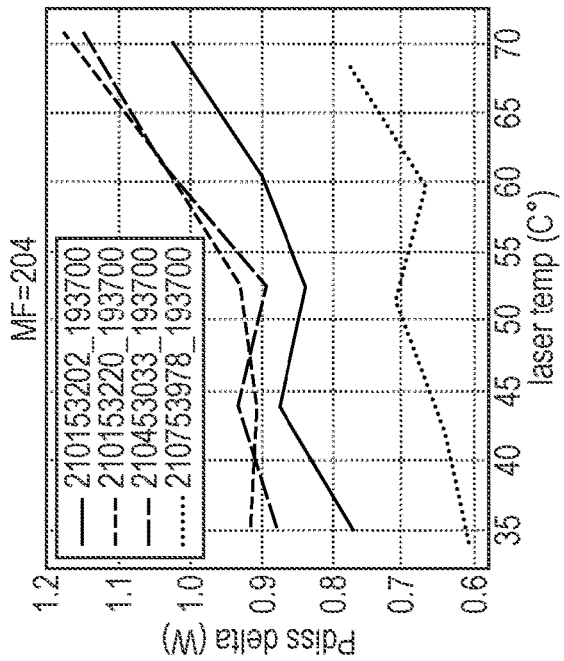
FIG. 3A
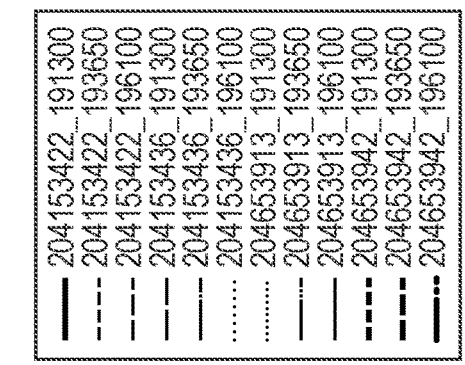
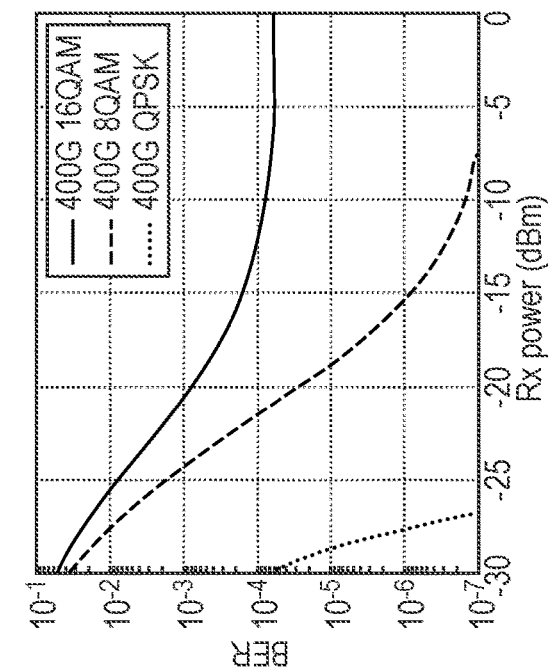
FIG. 3B
FIG. 3C

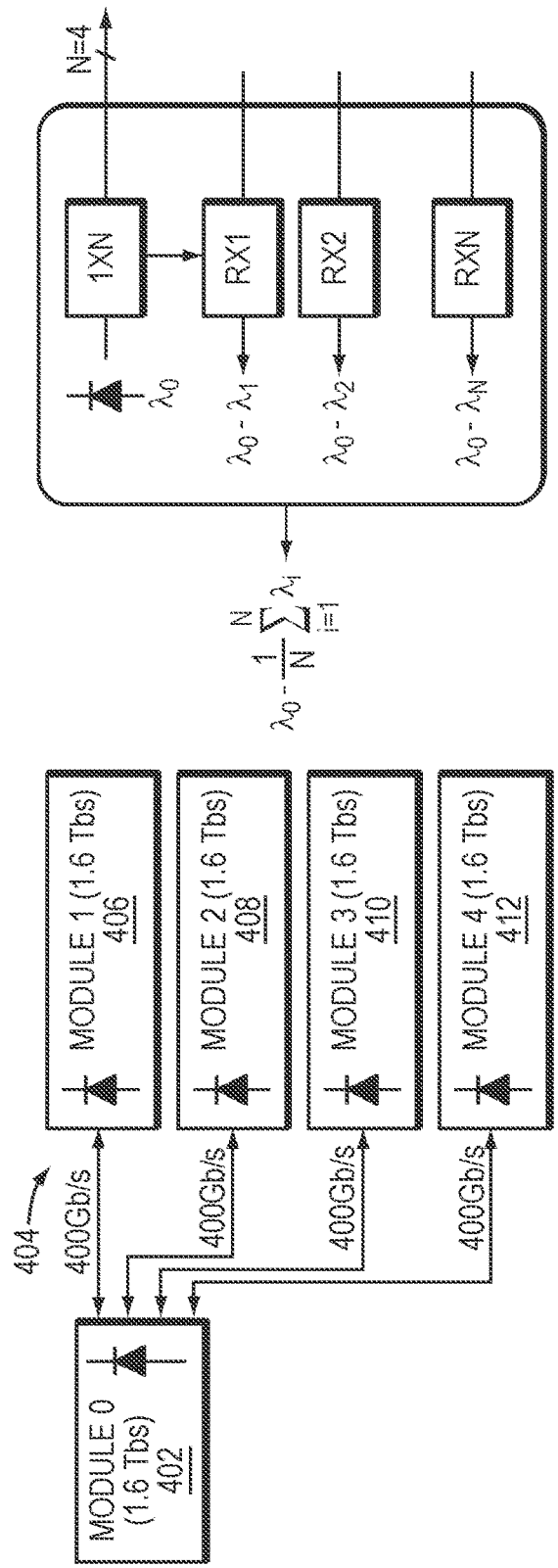
FIG. 4A
FIG. 4B
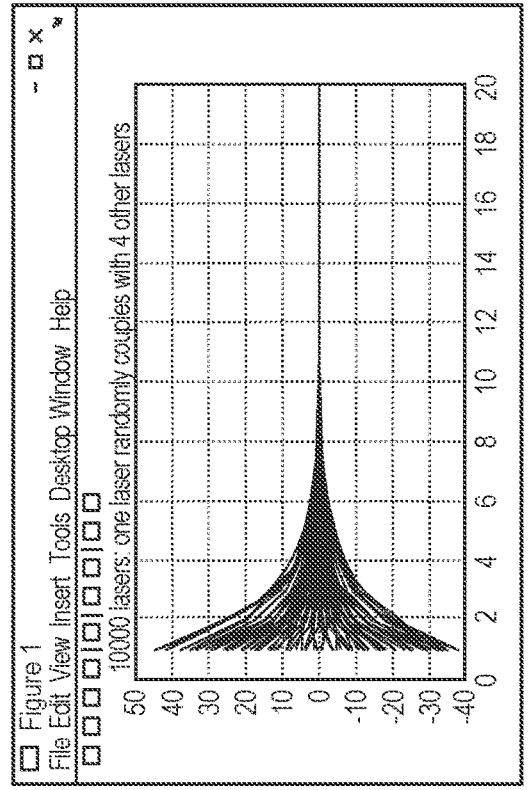
FIG. 4C

COHERENT OPTICAL BREAKOUT

CLAIM OF PRIORITY AND CROSS-REFERENCE TO RELATED APPLICATION

The present application claims the benefit under 35 U.S.C. § 119(e) of U.S. Patent Application Ser. No. 63/221,441, filed Jul. 13, 2021 entitled "COHERENT OPTICAL BREAKOUT," which is hereby incorporated herein by reference in its entirety.

BACKGROUND

Optical transmission of information over a fiber optic cable often encodes the information on a light wave.

SUMMARY

A method, system, and apparatus for a coherent optical breakout; wherein the optical breakout has a laser; wherein the coherent optical breakout has a set of optical connections; wherein the set has at least two optical connections; wherein the coherent optical breakout enables coherent optical communication of X Gbs across each of the set of optical connections.

BRIEF DESCRIPTION OF THE FIGURES

Various aspects and embodiments of the application will be described with reference to the following example embodiments. It should be appreciated that the figures are not necessarily drawn to scale.

FIG. 3A is a simplified illustration of a graph showing 400 G coherent BER vs. receiver power assuming module SNR (signal-to-noise ratio) is 19 dB, in accordance with an embodiment of the present disclosure;

FIG. 3B is a simplified illustration of a graph of an external cavity laser, in accordance with an embodiment of the present disclosure;

FIG. 3C is a simplified illustration of a graph showing Grey laser power consumption, in accordance with an embodiment of the present disclosure;

FIG. 4A is a simplified illustration of a diagram of the connections of a 1.6 T module to 4 other 1.6 T modules connected with 400 GB/s connections, in accordance with an embodiment of the present disclosure;

FIG. 4B is a simplified illustration of an algorithm to correct for frequency offset in lasers, in accordance with an embodiment of the present disclosure;

FIG. 4C is a simplified illustration of a graph showing frequencies of lasers converging, in accordance with an embodiment of the present disclosure;

DETAILED DESCRIPTION

Figures 1A, 1B, 1C, 1D:
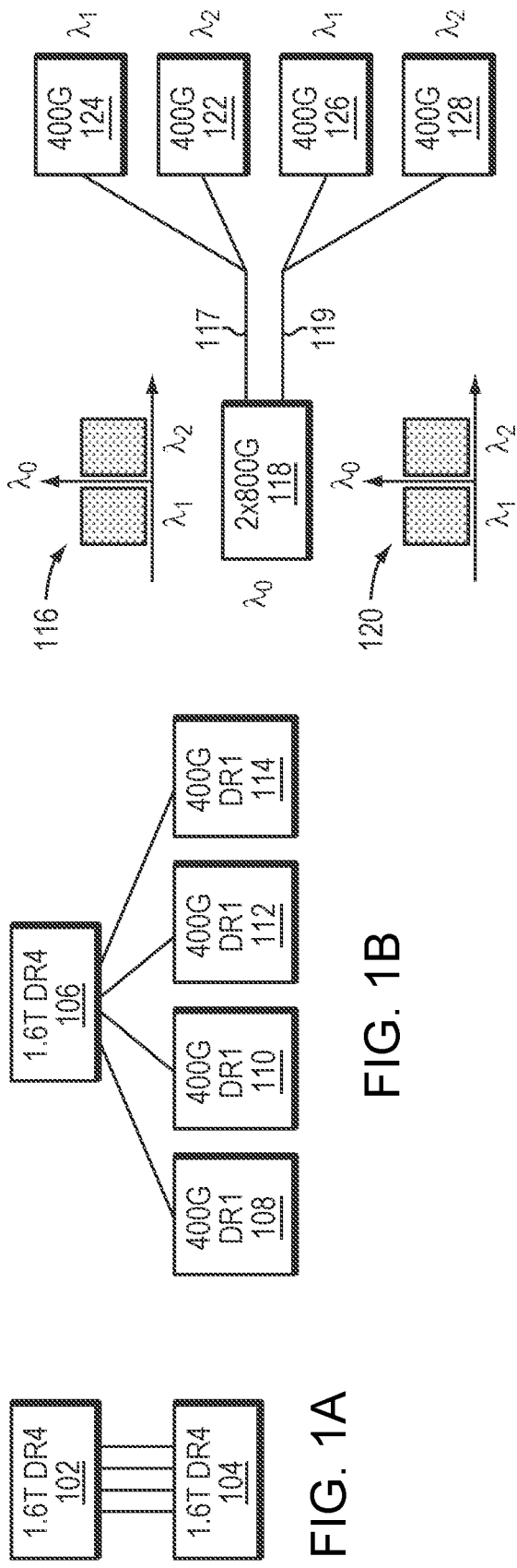
FIG. 1A is a simplified illustration of a non-breakout type application, in accordance with an embodiment of the present disclosure.
FIG. 1B is a simplified illustration of a sample breakout application, in accordance with an embodiment of the present disclosure.
FIG. 1C is a simplified illustration of an alternative sample breakout application, in accordance with an embodiment of the present disclosure.
FIG. 1D is a simplified illustration of a further sample breakout application, in accordance with an embodiment of the present disclosure.

In many embodiments, Applicants have realized that there is an unrelenting growth of hyperscale cloud networks that may require a dramatic increase in bandwidth with dense 100/200/400 GbE links spanning high-radix, ultra-low-latency network topologies. In some embodiments, Applicants have realized that switch capacity may achieve 51.2 terabits/sec in the near future. In certain embodiments, depending on a Radix of data center architecture, 1.6 T Ethernet rate may be soon reached. In some embodiments, Applicants have realized both IM-DD and coherent are strong candidates for 1.6 T Ethernet. In other embodiments, Applicants have realized that coherent may be pushing the application boundary into 2 km or less while 200 G IM-DD is limited to less than 1 km. In certain embodiments, Applicants have realized that 1.6 T FR8 (8× 200 G IM-DD) may suffer a dispersion penalty for edge channels at O band, while coherent is naturally more tolerant to the transmission effects including dispersion.

In most embodiments, Applicants have realized once coherent technology is adopted near the boundary of the intra-data center, it may be necessary to enable coherent to operate in a breakout topology, as breakout topologies are common inside the data center. In a particular embodiment, 1.6 T DR4 may have 4 400 Gbps connections between one coherent module and 4 other different coherent modules. Typically, however, coherent receiver requires both a transmitter laser and receiver laser (i.e., local oscillator) have close frequencies with each other to enable heterodyne detection. Conventionally, transmitter and receiver lasers that need to have close frequencies require each laser to have a frequency locker. Often, a frequency locker may require a TEC and etalon. In most embodiments, Applicants have realized that frequency lockers may make coherent too cost expensive to be used in a data center. In other embodiments, Applicants have realized if a single laser is used in one breakout module for laser cost saving, this breakout architecture may require lasers in all the breakout modules be eventually locked the same wavelength. In many embodiments, the current disclosure may enable use of a laser in coherent applications without use of a frequency locker.

In most embodiments, Applicants have realized to minimize both the cost and power consumption, a coherent-lite receiver may not use regular external cavity laser with TEC and wavelength locker to achieve better than +/−1.5 GHz absolute frequency. In many embodiments, Applicants have realized that these challenges for coherent breakout application in short-distance illustrate why there is no practical coherent breakout application.

In almost all embodiments, the current disclosure may enable a coherent application for breakouts. In some embodiments, the current disclosure may enable a module power consumption and laser power requirement to enable a cost effective short-distance coherent-lite receiver. In further embodiments, the current disclosure may enable a new laser frequency control algorithm to enable the use of grey laser in coherent breakout applications.

In certain embodiments, with a coherent breakout application, total data throughput R may be divided into R/n rate on n parallel fibers, i.e., DRn, where n is an integer.

In a particular embodiment, 1.6 terabits/sec may be used as R. In this particular example of 1.6 terabits/sec there may be several candidates for 1.6 T coherent: DR2 and DR4. In this example, a 1.6 T breakout may be a 1.6 T DR2 that has two 800 Gbps channels on two parallel fibers. In this example, in the alternative, a 1.6 T DR4 may have four 400 Gbps channels on four parallel fibers. In this example, 1.6 DR4 may support 400 GbE breakout while 1.6 T DR2 does not. In almost all embodiments, it may be beneficial to determine what coherent solution would be the most cost effective for a coherent-lite receiver.

Refer now to the example embodiment of FIG. 1A, which illustrates a non-breakout type application. In the example embodiment of FIG. 1A, there are two 1.6 T modules, 102 and 104m connected to each other through four 400 GB fiber connections. As there is a direct connection these two modules and no other modules, this is not a break-out architecture.

Refer now to the example embodiment of FIG. 1B, which illustrates a sample breakout application. In the example embodiment of FIG. 1B, 1.6 TB DR4 module 106 is connected to 4 400 GB DR1 modules, 108, 110, 112, and 114 respectively. The example embodiment of FIG. 1B is an example of a breakout application.

Refer now to the example embodiment of FIG. 1C, which illustrates a breakout application. In the example embodiment of FIG. 1C, 1.6 TB module 118 broadcasts 800 G across two lines, 117 119, each line containing two 400 GB signals at a different lambda over a single fiber. Graphs 116 and 120 illustrate the different lambdas that are transmitted over lines 117 and 119. Line 17 is received by 400 G connections 122 and 124. Line 119 is received by 400 G connections 126 and 128. In some embodiments, lambda may represent a frequency of a laser. In other embodiments lambda may represent digital encoding of two 400 GB signals on a single 800 GB output.

Refer now to the example embodiment of FIG. 1D, which illustrates another breakout application. In this example embodiment, there are a number of 1.6 T DR4 modules in row 140 and row 142. Each 1.6 T DR4 module is connected to 4 other 1.6 T DR4 through 400 GB connections. For example, in this example embodiment 1.6 T DR4 is connected to 1.6 T DR4 148, 1.6 T DR4 150, 1.6 T DR4 152, and 1.6 T DR4 154 via a series of 400 GB connections. In some embodiments, a top row of 1.6 TB modules may be typically called a spine and the bottom row of 1.6 T modules may be called a leaf.

Figure 2:
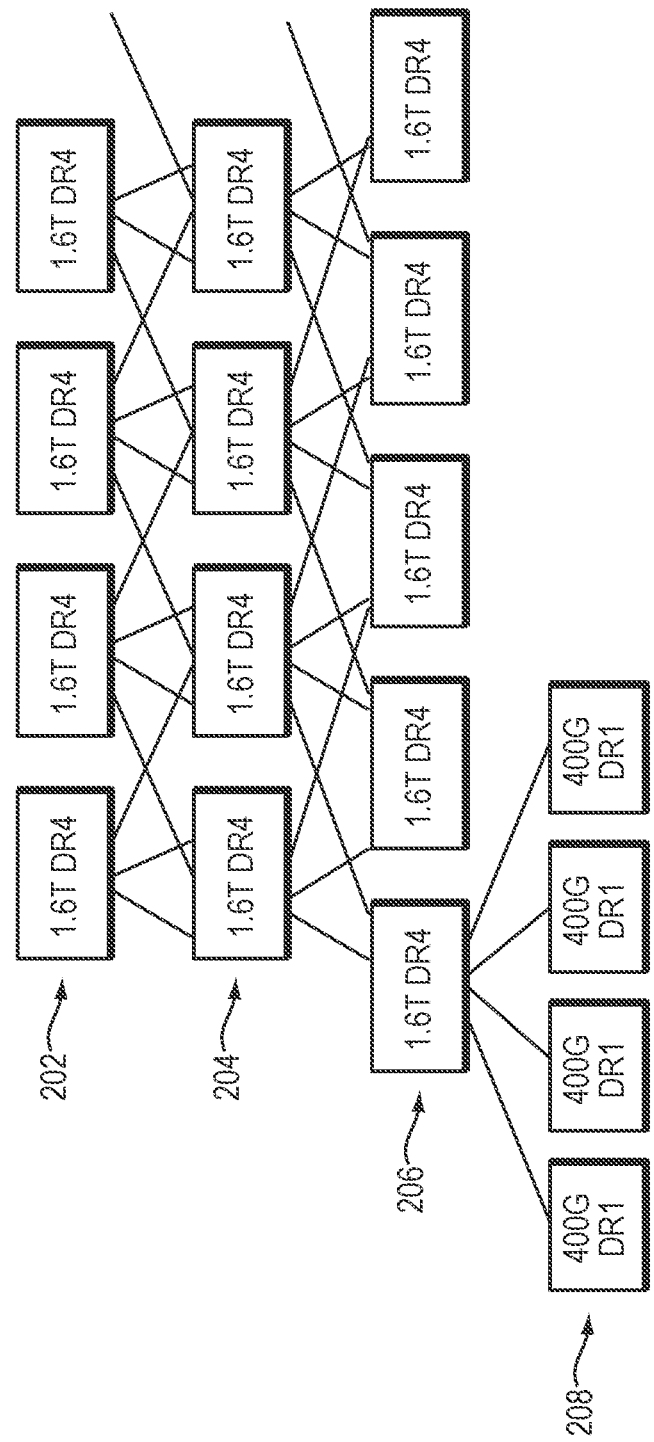
FIG. 2 is a simplified illustration of an alternative further sample breakout application, in accordance with an embodiment of the present disclosure.

Refer now to the example embodiment of FIG. 2, which illustrates an alternative breakout topology. In the example embodiment of FIG. 2, there are four rows of modules. Row 202 has a number of 1.6 T DR4 modules. Row 204 has a number of 1.6 T DR4 modules. The Modules of row 202 are connected to the modules of row 404 through a series of 400 GB connections. Row 206 has a number of 1.6 T DR4 modules. The modules of row 204 are connected to the modules of row 206 through a number of 400 GB connections. Row 208 has a number of 400 G DR1 modules. Each 1.6 T DR4 module of row 206 is connected to a 400 G DR1 module of row 208.

In most embodiments, it may be beneficial to optimize module power consumption and laser power requirement for coherent-lite receiver. In almost all embodiments, Applicants have realized that a 1.6 T DR4 based on QPSK may have a smallest laser cost. In many embodiments, to minimize ASIC (application-specific integrated circuit) power in short-distance coherent, a SNR of a DSP (digital signal processor) may be relatively lower than a long-haul application. In almost all embodiments, modulation format of a coherently link may essentially determine a Bit error rate (BER) floor. For example, referring to the example embodiment of FIG. 3A, 400 G 16QAM has a BER floor at 1e-4 while 8QAM has a BER floor at 1e-8.

|  | 112 Gbaud 16 QAM w/ inner SD FEC 800 Gbit/s | 71 Gbaud 8QAM w inner SD FEC 400 Gbit/s | 71 Gbaud 8QAM w/o inner SD FEC 400 Gbit/s | 106 Gbaud QPSK w inner SD FEC 400 Gbit/s | 106 Gbaud QPSK w/o inner SD FEC 400 Gbit/s | 56 Gbaud 16QAM w inner FEC 400 Gbit/s | 100 G 53Gbd PAM4 KP4 FEC |
|---|---|---|---|---|---|---|---|
| TX DC Loss (dB) | 9.8 | 9.8 | 9.8 | 9.8 | 9.8 | 9.8 | 10.35 |
| Link loss with margin (dB) | 9.4 | 5 | 5 | 5 | 5 | 9.4 | 9.40 |
| FEC threshold | 2.00E−03 | 2.00E−03 | 2.00E−04 | 2.00E−03 | 2.00E−04 | 2.00E−03 | 2.00E−04 |
| RX power (dBm) | −18.3 | −23.80 | −21.30 | −28.80 | −27.10 | −20.60 | −9.30 |

-continued

|  | 112 Gbaud 16 QAM w/ inner SD FEC 800 Gbit/s | 71 Gbaud 8QAM w inner SD FEC 400 Gbit/s | 71 Gbaud 8QAM w/o inner SD FEC 400 Gbit/s | 106 Gbaud QPSK w inner SD FEC 400 Gbit/s | 106 Gbaud QPSK w/o inner SD FEC 400 Gbit/s | 56 Gbaud 16QAM w inner FEC 400 Gbit/s | 100 G 53Gbd PAM4 KP4 FEC |
|---|---|---|---|---|---|---|---|
| Vpp/Vpi | 0.5 | 0.30 | 0.40 | 0.30 | 0.30 | 0.40 | 0.40 |
| RX BW (GHz) | 70 | 44.00 | 44.00 | 66.00 | 66.00 | 35.00 | 40.00 |
| optimal LO power (dBm) | 8.7 | 6.50 | 6.90 | 5.00 | 5.00 | 6.60 |  |
| TX/RX split ratio | 0.83 | 1.60 | 1.76 | 4.30 | 3.31 | 1.45 |  |
| laser power (dBm) | 16.28 | 11.50 | 11.66 | 7.02 | 7.70 | 12.05 | 11.75 |

Example embodiment of Laser power requirement for 1.6 T DR2 and DR4 with different modulation formats In many embodiments, depending on a choice of FEC (usually 2e-4 with KP4 FEC or 2e-3 with 6% overhead soft-decision FEC) and span loss, required total laser power may also be determined by a choice of modulation format. In the example embodiments illustrated in the laser power requirement charts, 1.6 T DR4 based on QPSK can share a single laser but 1.6 T DR2 based on 16QAM needs two lasers if the maximum laser power is limited to 17 dBm. In most embodiments, being at or below 17 dBm may be important for cost reasons. In other embodiments, a direct detect solution such as 16×100 PAM4 may require 4 lasers. In almost all embodiments, reducing the number of lasers in an application gives a saving of laser cost.

In the example embodiments of the charts of laser power requirements, the total module power for different 1.6 T candidates is calculated and, while it turns out the module power are very close among these choices, QPSK turns out to be the best choice. In some embodiments, these results may require that a laser be locked to a particular frequency to enable coherent communication.

may refer to adding additional data to a data stream on a transmit side to enable errors to be recovered on a receive side.

In almost all embodiments, Applicants have realized that there is not a current solution how to use a cheap and low power laser in coherent breakout application. In most embodiments, Applicants have realized that the use of more expensive or multiple lasers has caused coherent to be cost prohibitive and not used in breakout applications in data centers.

Refer now to the example embodiment of FIGS. 3A, 3B and 3C. FIG. 3A illustrates 400 G coherent BER vs. receiver power assuming module SNR is 19 dB. FIG. 3B shows an external cavity laser. FIG. 3C shows Grey laser power consumption. In these figures, a grey laser is based on a DFB diode and has a lower power consumption than a regular tunable external cavity laser of FIG. 3C. In these figures, the grey laser is also cheaper since there is no wavelength locker to control the laser frequency. In these embodiments, it is guaranteed the grey laser absolute frequency error less than +/−20 GHz over its lifetime. In almost all embodiments, Example embodiment of Laser power requirement for 1.6T DR2 and DR4 with different modulation formats Total module power for 1.6T throughput (typical process, 95C die)

|  | 16x100 G 53 Gbaud PAM4 | | 4x400 G 56 Gbaud 16QAM | | 4x400 G 106 Gbaud QPSK | | 2x800 G 112 Gbaud 16QAM | |
|---|---|---|---|---|---|---|---|---|
| Optics format: | 5 nm/ 22FDX | 3 nm/ FDX22+ | 5 nm/ 22FDX | 3 nm/ FDX22+ | 5 nm/ 22FDX | 3 nm/ FDX22+ | 5 nm/ 22FDX | 3 nm/ FDX22+ |
| Host SerDes | 6.88 | 6.02 | 6.88 | 6.02 | 6.88 | 6.02 | 6.88 | 6.02 |
| Optics ADC + DAC | 5.68 | 4.97 | 5.68 | 4.97 | 7.20 | 6.30 | 7.00 | 6.13 |
| Optics DSP | 1.60 | 1.16 | 3.66 | 2.65 | 3.50 | 2.53 | 3.48 | 2.53 |
| ASIC total | 14.16 | 12.15 | 16.22 | 13.64 | 17.58 | 14.85 | 17.36 | 14.67 |
| Driver | 4.00 | 3.20 | 4.00 | 3.20 | 3.00 | 2.40 | 3.00 | 2.40 |
| TIA | 2.40 | 1.92 | 2.40 | 1.92 | 3.60 | 2.88 | 1.80 | 1.44 |
| Laser | 3.00 | 3.00 | 1.50 | 1.50 | 0.75 | 0.75 | 1.50 | 1.50 |
| OSC, PLL, CPLD, ctrl loops, FLASH | 0.50 | 0.50 | 0.50 | 0.50 | 0.50 | 0.50 | 0.50 | 0.50 |
| DC-DC | 2.67 | 2.31 | 2.74 | 2.31 | 2.83 | 2.38 | 2.68 | 2.28 |
| Module total | 26.73 | 23.08 | 27.35 | 23.07 | 28.25 | 23.76 | 26.85 | 22.79 |

In almost all embodiments, it may be important to control laser frequency in a coherent breakout that shares a single laser. From the example embodiments of the Laser power requirements, it is shown that 1.6 T DR4 based on QPSK is attractive because (1) it has lowest BER floor and no need of inner FEC, therefore it has lower latency (2) it needs one laser for 1.6 T module. (3) it supports 400 GbE breakout. In most embodiments FEC may refer to forward error correction. In almost all embodiments, forward error correction Applicants have realized that there may not be a means to synchronize the transmitter laser and receiver laser in coherent break out application.

In some embodiments, a grey laser may be a laser with a fixed wavelength in a WDM grid as opposed to a tunable across the grid. In many embodiments, while a grey laser is on a fixed wavelength "slot," the grey laser may have an amount of tunability to lock with a remote laser on another end.

Refer now to the example embodiments of FIGS. 4A and 4B, which illustrates a coherent breakout connection and module laser frequency control. In these example embodiment, Module 0 402 is a coherent module has a single laser. Module 0 402 is in communication with module 1 406, module 2 408, module 3 410, and module 412 through a 400 GB connection such as connection 404. Modules 1-4 each have a single laser. Communication between the modules is bi-directional. FIG. 4B illustrates a module laser frequency control.

Assuming laser $\lambda_0$ is the laser frequency of module 0 402 and each 400 G signal is connected with the 4 other modules which laser frequency $\lambda_j$, j=1,2,3,4 as shown FIG. 4B. In module 0 402, four coherent receivers share the same laser as local oscillators. In each coherent receiver, the frequency difference between $\lambda_0$ and $\lambda_j$, j=1,2,3,4 can be determined. The laser frequency error is thus calculated as the average of these frequency difference as shown FIG. 4B. Thus, module 0 is adjusting laser frequency to reduce the difference between $\lambda_j$ and the average frequency of other N modules connected with module 0. This process continuous until all the lasers are converged to the same frequency.

In many embodiments, Applicants have simulated using the algorithm of FIGS. 4a and 4b, with 10000 modules with a random connection in a data center. In these many embodiments, an initial laser frequency error was randomly distributed around zero with +/−40 Ghz error. Refer now as well to the example embodiment of FIG. 4C. As shown in FIG. 4C, after a few iterations, all the laser frequencies converge together.

In other embodiments, each module may send out (via "overhead bits" or a "side channel") an amount by which its laser has been detuned from the initial/default setting. In certain embodiments, a module may calculate both an average frequency error, but also an average amount of detuning. In some embodiments, a module may adjust its own laser (to reduce the frequency offset error) if that does not cause detuning of its laser to be significantly larger than detuning of other lasers. In certain embodiments, the algorithm of FIG. 4B may be modified to include feedback from side channel communication.

Figures 5A, 5B:
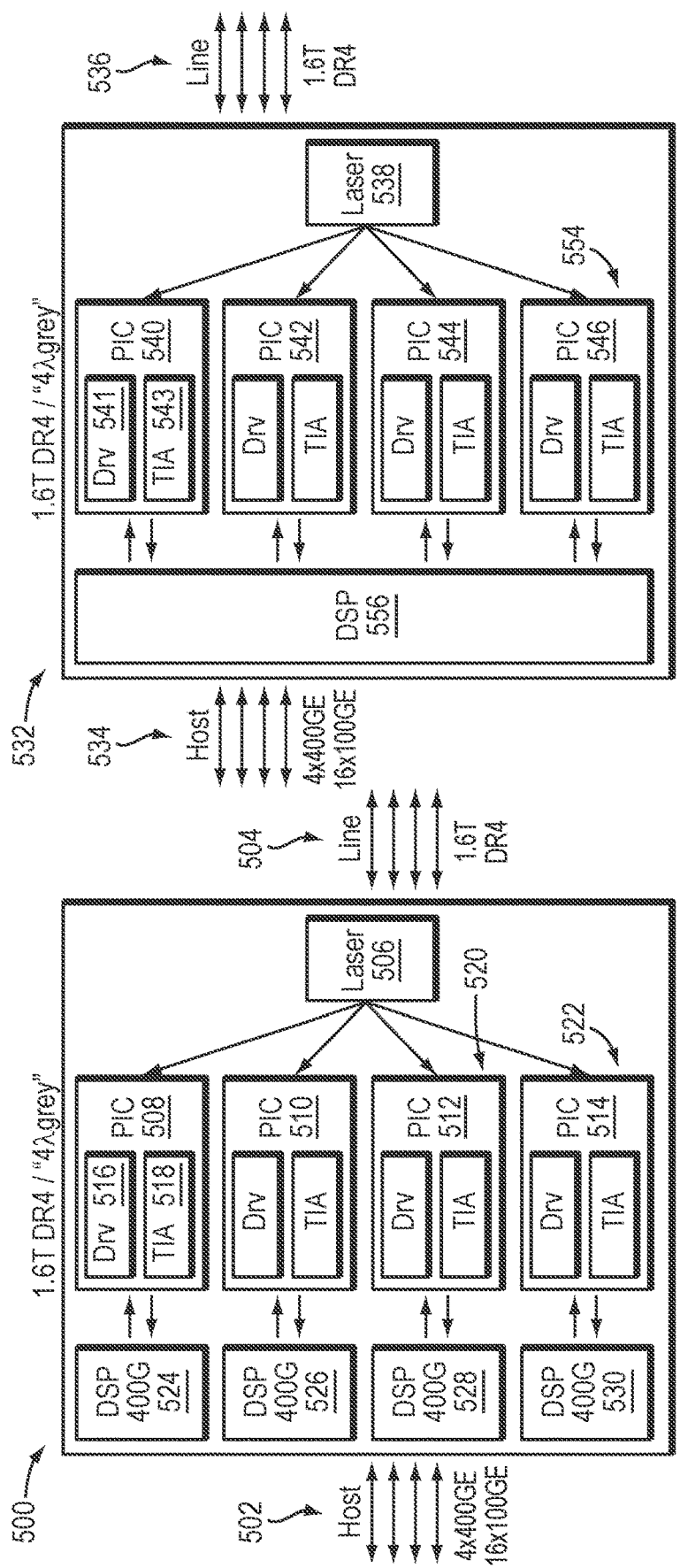
FIG. 5A is a simplified illustration of a 1.6 T DR4 switch, in accordance with an embodiment of the present disclosure.
FIG. 5B is an alternative simplified illustration of a 1.6 T DR4 switch, in accordance with an embodiment of the present disclosure.

Refer now to the example embodiment of FIG. 5A. In the example embodiment of FIG. 5A, for each optical connection there is a discrete DSP and a discrete PIC, (photonic integrated circuit), and a common laser. Module 500 is connected to host 502, Line 504, and has Laser 506. Module 500 also has PIC 508, 510, 512, and 514. Each PIC has a driver and TIA, such as driver 516 and TIA 518 of PIC 508. Module 500 has DSP 524, DSP 526, DSP 528 and DSP 540.

Refer now to the example embodiment of FIG. 5B, which illustrates a single DSP across all optical connections and discrete PICs for each optical connection, and a common laser. Module 532 is connected to Host 534, Line 536, and has Laser 528. Module 532 also has DSP and PIC 540, PIC 544, and PIC 546. Each PIC has a TIA and Driver, such as Driver 541 and TIA 543.

Figures 5C, 5D:
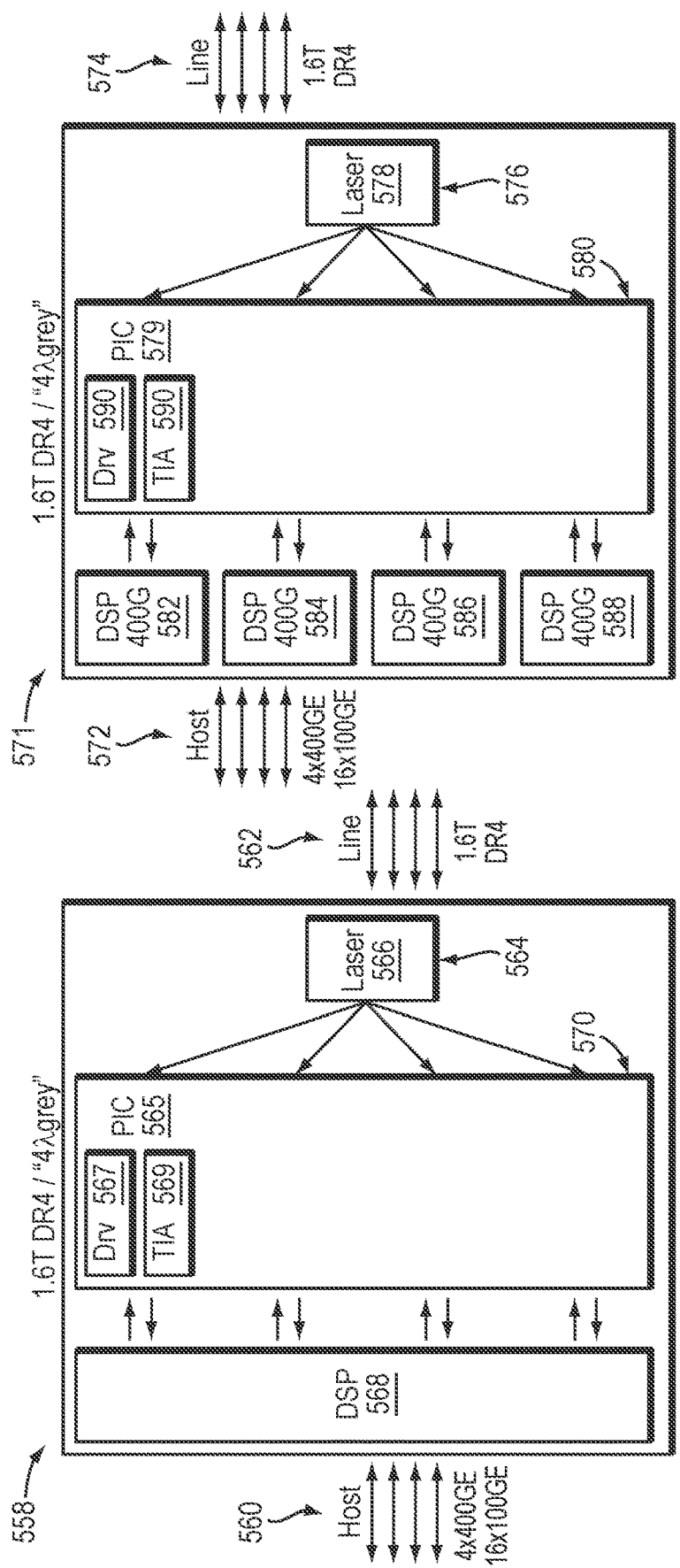
FIG. 5C is a further alternative illustration of a 1.6 T DR4 switch, in accordance with an embodiment of the present disclosure.
FIG. 5D is an additional simplified illustration of a 1.6 T DR4 switch, in accordance with an embodiment of the present disclosure.

Refer now to the example embodiment of FIG. 5C, which illustrates a single DSP across all optical connections and a single PIC for each optical connection, and a common laser. Module 558 is connected to host 560 and line 562. Module 558 has laser 562, DSP 568, and PIC 570. PIC 570 has driver 567 and TIA 569.

Refer now to the example embodiment of FIG. 5D, which illustrates a DSP for each optical connections and a single PIC for each optical connection, and a common laser. Module 571 is connected to host 572 and line 574. Module 571 has laser 576, PIC 580, DSP 582, DSP 584, DSP 586, and DSP 588. PIC 580 has Driver 590 and PIC 592.

FIGS. 5A-5D illustrate sample variations of modules that may be used to reduce cost of a coherent breakout. In other embodiments, different variations of modules may be created to reduce cost.

In many embodiments, Applicants have realized that it may be beneficial to not fully tune each laser's frequency to the same point as every other laser. In most embodiments, a DSP may be unable to correct more than a 20 Ghz drift between lasers. In certain embodiments, a DSP may be able to correct for a 10 Ghz difference between lasers. In some embodiments, Applicants have realized that if all lasers are tuned to have a very low difference, then if a laser need to be replaced or if another laser needs to be added, then it may take a while to tune the new laser to the frequencies of the other laser. In further embodiments, if many new lasers are added or two data centers are connected together, then it may take long time for the lasers to synchronize to a common frequency.

In most embodiments, Applicants have realized that it may be beneficial to tune only one row of a network topology. In many embodiments, Applicants have realized that running a row or alternating rows of a network topology may result in an error of 10 Gz, within the ability of a DSP to recover errors caused by the difference in laser frequencies. In some embodiments herein, LO may refer to local oscillator.

Figure 6:
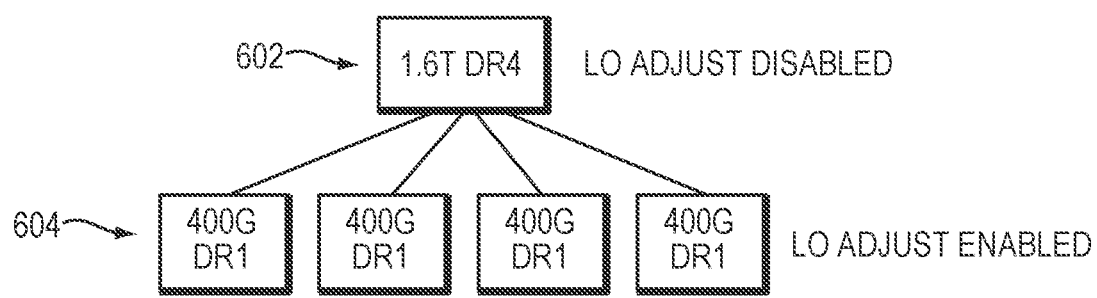
FIG. 6 is a simplified illustration of an optical breakout, in accordance with an embodiment of the present disclosure.

Refer now to the example embodiment of FIG. 6, which illustrates a sample breakout with LO used at one level of the topology. In the example embodiment of FIG. 6, top row 602 is a 1.6 T DR4 Module with a laser has LO adjustment disabled and the bottom row 604, which is 4 400 G DR1s, uses LO adjustment. In this example embodiment, LO Offset is reduced to control accuracy<0.1 GHz.

Figure 7:
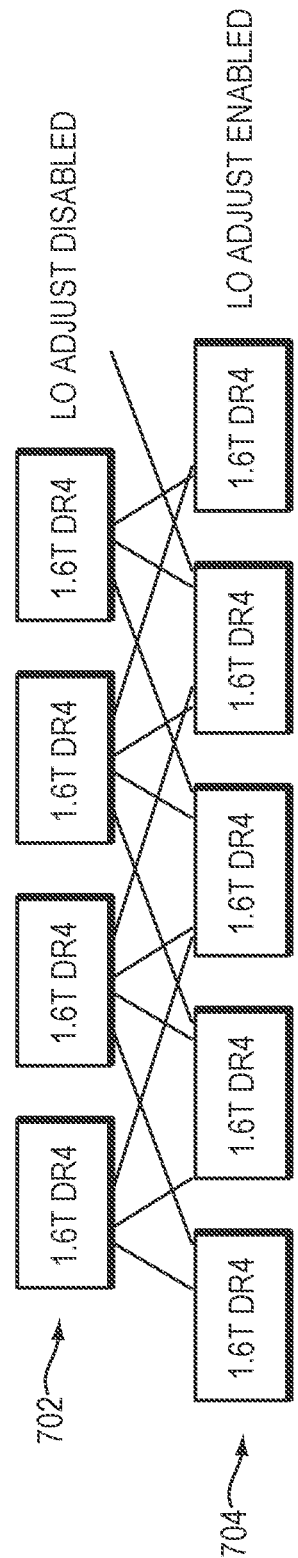
FIG. 7 is a simplified illustration of an alternative example of an optical breakout with two levels, in accordance with an embodiment of the present disclosure.

Refer now to the example embodiment of FIG. 7, which illustrates a sample breakout with LO used at one level of the topology. In the example embodiment of FIG. 7, top row 702, which is a set of 1.6 T DR4s, has LO adjustment disabled and bottom row 704, which is a set of 1.6 T DR4s, uses LO adjustment. In this example embodiment, Max LO Offset is reduced to ½ (Max-Min) Laser variation i.e., LO offset of 10 GHz vs 20 GHz if Laser EOL spec is +− 10 GHz.

Figure 8:
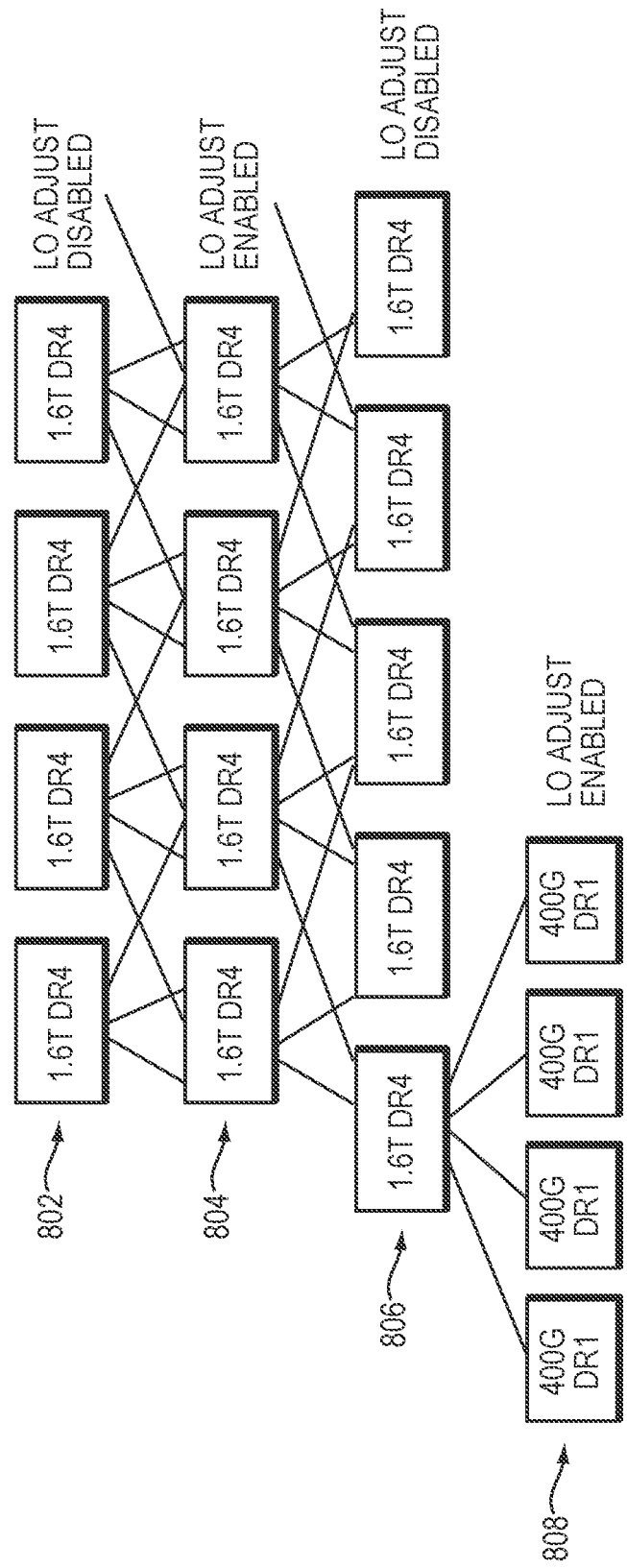
FIG. 8 is a simplified illustration of an optical breakout with 4 levels, in accordance with an embodiment of the present disclosure.

Refer now to the example embodiment of FIG. 8, which illustrates a sample breakout with LO used at alternative levels of the topology. In the example embodiment of FIG. 8, top row 802 has LO adjustment disabled, next row 804 uses LO adjustment, next row 806 has LO disabled, and final row 808 uses LO adjustment.

Figure 9A:
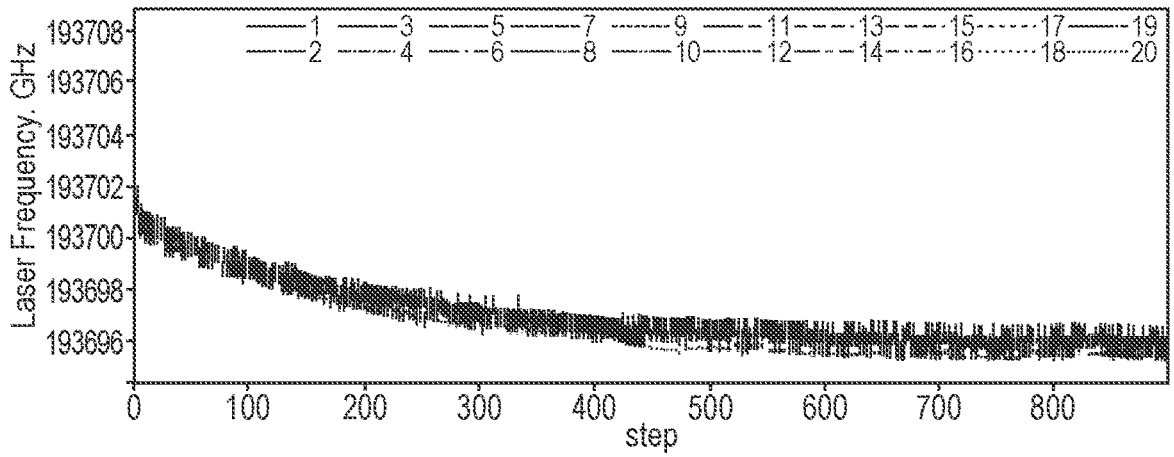
FIG. 9A is a simplified illustration of a graph showing tuning over life of lasers, in accordance with an embodiment of the present disclosure.
Figure 9B:
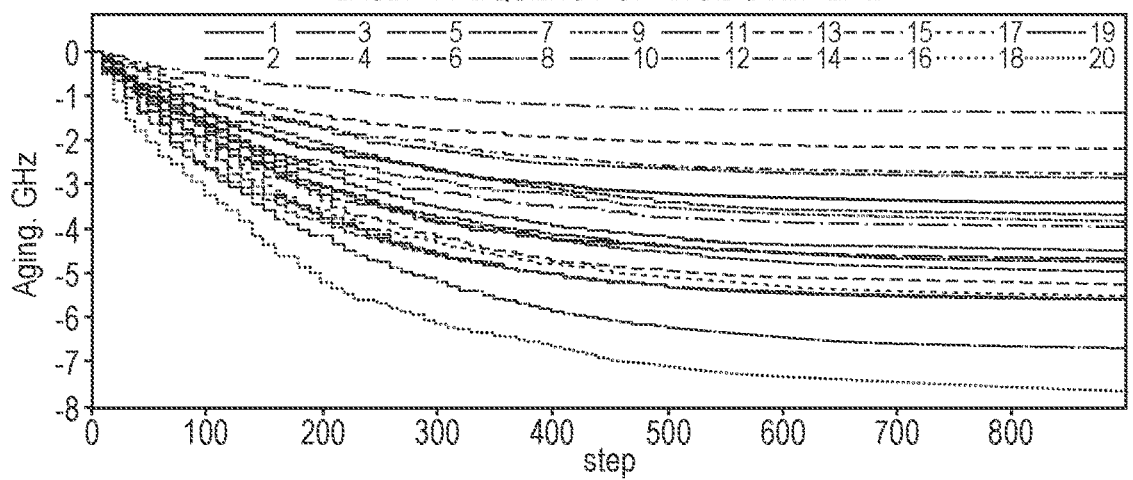
FIG. 9B is a simplified illustration of a graph of different changes of frequency of lasers' lives, in accordance with an embodiment of the present disclosure.
Figure 9C:
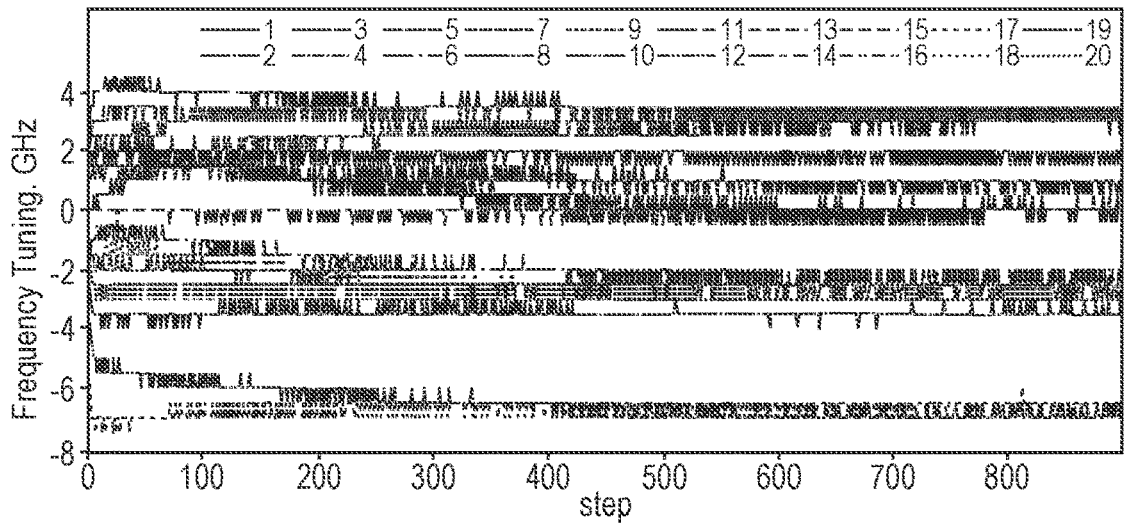
FIG. 9C is a simplified illustration of a chart of laser tuning over life of a laser, in accordance with an embodiment of the present disclosure.

Refer now to the example embodiments of FIGS. 9A-9C, illustrating laser wavelengths over time. In these example embodiments, FIG. 9A illustrates the laser frequency in modules with DSP feedback on over life with LO offset<2 GHz. FIG. 9B illustrates laser frequency change over time without tuning. FIG. 9C illustrates laser tuning over life.

Figure 9D:
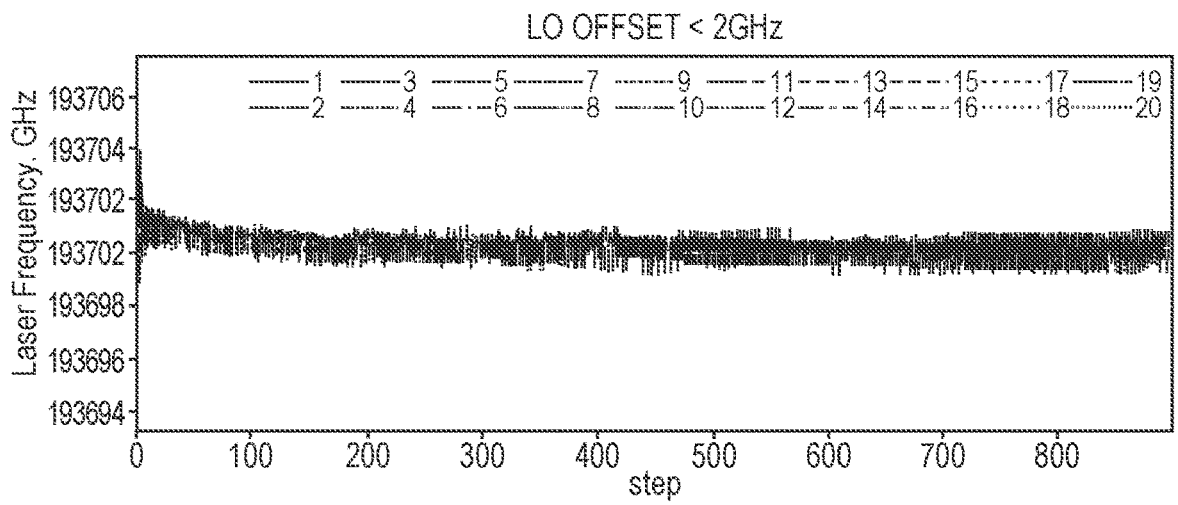
FIG. 9D is a simplified illustration of a graph showing tuning over life of lasers, in accordance with an embodiment of the present disclosure.
Figure 9E:
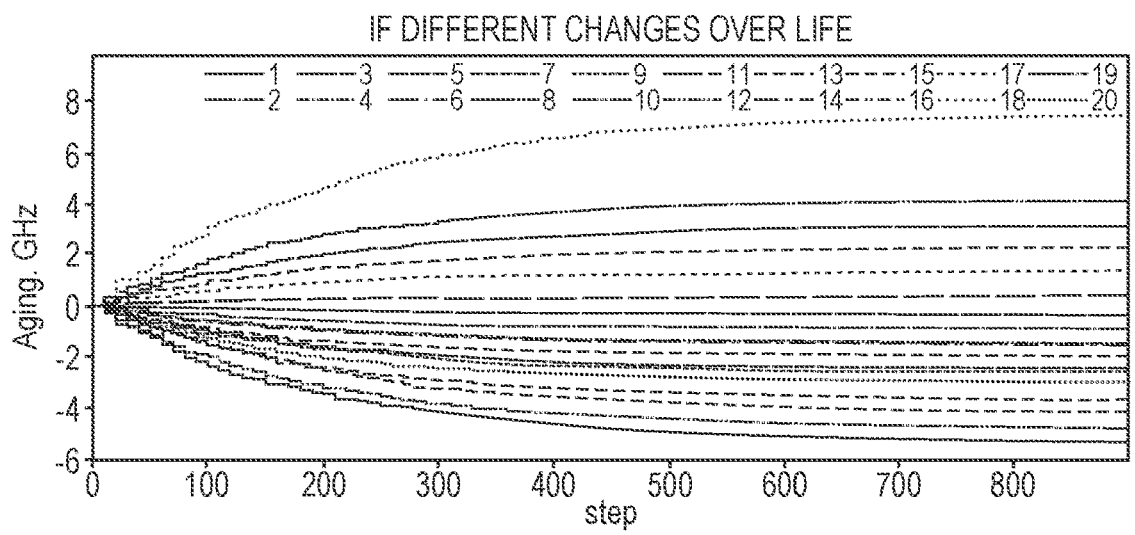
FIG. 9E is a simplified illustration of a graph of different changes of frequency of lasers' lives, in accordance with an embodiment of the present disclosure.
Figure 9F:
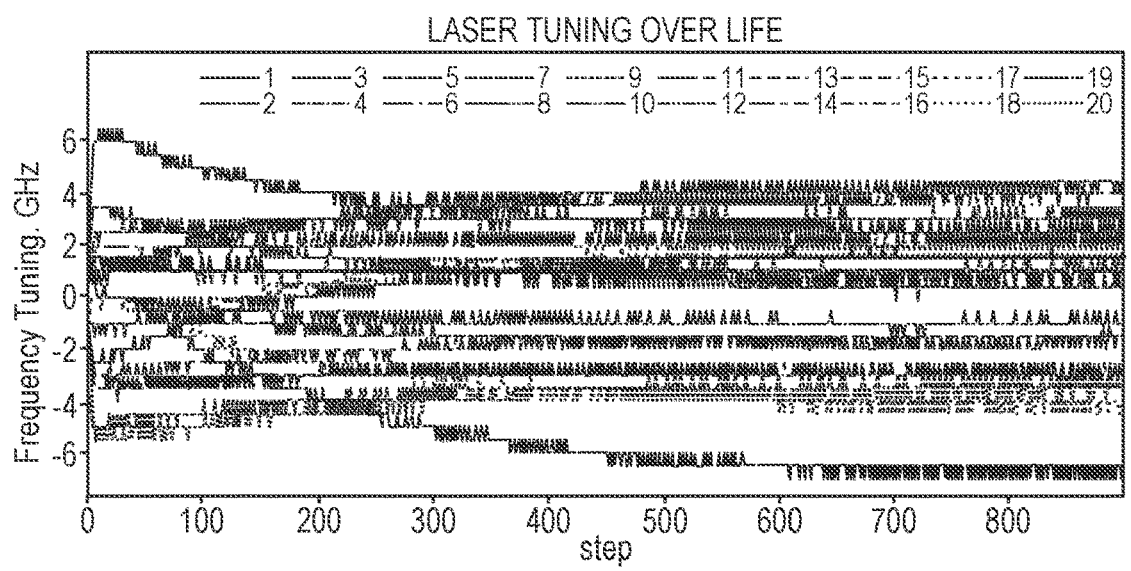
FIG. 9F is a simplified illustration of a chart of laser tuning over life of a laser, in accordance with an embodiment of the present disclosure.

Refer now to the example embodiments of FIGS. 9D-9F, which illustrates aging in opposite directions. In these example embodiments, FIG. 9D illustrates the laser frequency in modules with DSP feedback on over life with LO offset<2 GHz. FIG. 9E illustrates laser frequency change over time without tuning. FIG. 9F illustrates laser tuning over life.

In some embodiments, a coherent optical breakout may have a laser and set of optical connections and enable coherent optical communication of X Gbs across each of the set of optical connections. In many embodiments, coherent optical communication across each of the set of connections may be bidirectional and separate optical fibers may be used for each direction of coherent optical communication. In certain embodiments, a coherent optical breakout may enable a frequency of a laser to be aligned with frequencies of incoming coherent optical communication from each of a set of optical connections.

In many embodiments, a laser of a coherent optical breakout may not have a have frequency locker. In some embodiments, a coherent optical breakout may include logic to average frequency offsets of each optical communication of each of the a of optical connections and may include logic to align frequencies across the set of optical connections. In certain embodiments a coherent optical breakout may include one DSP ASIC for each of a set of optical connections. In many embodiments, a coherent optical breakout may include a single DSP ASIC for a set of optical connections. In some embodiments, a coherent optical breakout may have a PIC for each of a set of optical connections. In certain embodiments, a coherent optical communication may be encoded in a QPSK format. In many embodiments, a format of coherent optical communication may be selected to minimize a cost and power of each optical connection of a set of optical connections.

In some embodiments, optical communications of each of a set of optical connections may be driven by a laser of another breakout. In certain embodiments, optical communications of each of a set of optical connections is driven by a second laser of second breakout and at least a second of optical communications of each of a set of optical connections is driven by a third laser of a third breakout. In many embodiments, each optical communications of each of the set of optical communications may be driven by different lasers of different breakouts. In some embodiments, a laser may be a shared laser; wherein the shared laser is used to enabled coherent optical communication of X Gbs across each of a set of optical connections.

In some embodiments, a first coherent optical breakout may have a laser and a first set of optical connections and enables coherent optical communication of X Gbs across each of the set of optical connections. In certain embodiments, a coherent optical module optically may be coupled to a first optical connection of a set of optical connections of a first coherent breakout.

In some embodiments, a coherent optical module may be second coherent optical breakout may have a second laser having and may have a second set of optical connections and may enable enables coherent optical communication of X Gbs across each of the second set of optical connections. In some embodiments, optical breakouts may be optically coupled by a first optical connection of a first set of optical connections connected to a second optical connection of a second set of optical connections. In certain embodiments, a third optical breakout may have a third set of optical connections and may enable coherent optical communication of X Gbs across each of a second set of optical connections; wherein a third optical connection of a third set of optical connections may be connected a second optical connection of the second set of optical connections.

In certain embodiments, a second optical module may be optically coupled to a second optical connection of a first set of optical connections of a first coherent breakout. In many embodiments, a second optical module may be optically coupled to a second optical connection of a first set of optical connections of a first coherent breakout. In certain embodiments, coherent optical communication across each of a set of connections is enabled to be bidirectional and separate optical fibers may be used for each direction of coherent optical communication. In some embodiments, a coherent optical breakout may contain logic to enable a frequency of a laser to be aligned with frequencies of incoming coherent optical communication from each of a set of optical connections. In other embodiments, each laser of each coherent optical breakout may not have a frequency locker.

In many embodiments, coherent optical breakout may include logic to average frequency offsets of each optical communication of each of its set of optical connections. In some embodiments, each optical breakout may include includes logic to align frequencies across a set of optical connections. In certain embodiments, each coherent optical breakout may include one DSP ASIC for each of a set of optical connections. In many embodiments, each coherent optical breakout may include a single DSP ASIC for a set of optical connections.

In many embodiments, a coherent optical breakout may include a PIC for each of a set of optical connections. In some embodiments, each coherent optical breakout may include a PIC for a set of optical connections. In other embodiments, coherent optical communication may be encoded in a QPSK format. In certain embodiments, a format of coherent optical communication may be selected to minimize a cost and power of each optical connection of a set of optical connections. In some embodiments, optical communications of each of a set of optical connections may be driven by a laser of another breakout.

In some embodiments, one or more of the techniques described herein may be stored on a computer readable medium. In certain embodiments, a computer readable medium may be one or more memories, one or more hard drives, one or more flash drives, one or more compact disk drives, or any other type of computer readable medium. In certain embodiments, one or more of the embodiments described herein may be embodied in a computer program product that may enable a processor to execute the embodiments. In many embodiments, one or more of the embodiments described herein may be executed on at least a portion of a processor.

In most embodiments, a processor may be a physical or virtual processor. In other embodiments, a virtual processor may be spread across one or more portions of one or more physical processors. In certain embodiments, one or more of the techniques or embodiments described herein may be embodied in hardware such as a Digital Signal Processor DSP. In certain embodiments, one or more of the embodiments herein may be executed on a DSP. One or more of the techniques herein may be programed into a DSP. One or more of the techniques herein may be fabricated in a DSP. In some embodiments, a DSP may have one or more processors and one or more memories. In certain embodiments, a DSP may have one or more computer readable storages. In other embodiments, one or more of the embodiments stored on a computer readable medium may be loaded into a processor and executed.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:

1. An apparatus comprising:
a coherent optical breakout comprising at least one input; wherein the coherent optical breakout has a laser; wherein the coherent optical breakout has a set of optical connections to output optical signals; wherein the set has at least two optical connections; wherein the coherent optical breakout enables coherent optical communication at a pre-determined gigabits per second, Gbs, across each of the set of optical connections, wherein the coherent optical breakout further comprises logic to average frequency offsets of each optical communication of each of the set of optical connections: wherein the coherent optical breakout further comprises logic to align frequencies across the set of optical connections.

2. The apparatus of claim 1 wherein the coherent optical communication across each of the set of connections is enabled to be bidirectional; wherein separate optical fibers are used for each direction of coherent optical communication.

3. The apparatus of claim 2 wherein the coherent optical breakout contains logic to enable a frequency of the laser to be aligned with frequencies of incoming coherent optical communication from each of the set of optical connections.

4. The apparatus of claim 3 wherein the laser does not have frequency locker.

5. The apparatus of claim 4, wherein the coherent optical breakout further includes one DSP ASIC for each of the set of optical connections.

6. The apparatus of claim 4 wherein the coherent optical breakout further includes a single digital signals processor, DSP, application-specific integrated circuit, ASIC, for the set of optical connections.

7. The apparatus of claim 4, wherein the coherent optical breakout includes a photonic integrated circuit, PIC, for each of the set of optical connections.

8. The apparatus of claim 4, wherein the coherent optical breakout further includes a photonic integrated circuit, PIC, for the set of optical connections.

9. The apparatus of claim 1, wherein the coherent optical communication is encoded in a quadrature phase-shift keying, QPSK, format.

10. The apparatus of claim 1, wherein each of the optical communication of each of the set of optical connections is driven by a laser of another breakout.

11. A system comprising:
a first coherent optical breakout comprising at least one input; wherein the first coherent optical breakout has a laser; wherein the first coherent optical breakout has a first set of optical connections to output optical signals; wherein the first set has at least two optical connections; wherein the first coherent optical breakout enables coherent optical communication at a pre-determined gigabits per second, Gbs, across each of the first set of optical connections; and
a coherent optical module; wherein the coherent optical module is optically coupled to a first optical connection of the first set of optical connections of the first coherent optical breakout, wherein the coherent optical module is a second coherent optical breakout; wherein the second coherent optical breakout has a second laser; wherein the second coherent optical breakout has a second set of optical connections; wherein the second set has at least two optical connections; wherein the second coherent optical breakout enables coherent optical communication at the pre-determined Gbs across each of the second set of optical connections; and wherein the coherent optical module is optically coupled by the first optical connection of the first set of optical connections being connected to a second optical connection of the second set of optical connections.

12. The system of claim 11, further comprising:
a third coherent optical breakout; wherein the third coherent optical breakout has a third laser; wherein the third coherent optical breakout has a third set of optical connections; wherein the third set has at least two optical connections; wherein the third coherent optical breakout enables coherent optical communication at the pre-determined Gbs across each of the third set of optical connections; wherein a third optical connection of the third set of optical connections is connected to a second optical connection of the second set of optical connections.

13. The system of claim 11, further comprising a second optical module; wherein the second optical module is optically coupled to a second optical connection of the first set of optical connections of the first coherent optical breakout.

14. The system of claim 12, further comprising a second optical module; wherein the second optical module is optically coupled to a second optical connection of the first set of optical connections of the first coherent optical breakout.

15. The system of claim 13 wherein the coherent optical communication across each of the first set of connections is enabled to be bidirectional; wherein separate optical fibers are used for each direction of coherent optical communication.

16. The system of claim 13, wherein each coherent optical breakout contains logic to enable a frequency of the laser to be aligned with frequencies of incoming coherent optical communication from each of the first set of optical connections.

17. A method for communication of optical data comprising:
- sending coherent optical data between coherent optical breakouts; wherein each coherent optical breakout has at least two communication connections to output optical signals and at least one input; wherein each coherent optical breakout comprises a laser; wherein the laser drives communications across each respective two communication connections;
- averaging, by the each coherent optical breakout, frequency offsets of each optical communication of the at least two communication connections; and
- aligning, by the each coherent optical breakout, frequencies across the at least two communication connections.

* * * * *